Feb. 13, 1934.  K. D. PRESTON ET AL  1,946,759
SIGNAL SYSTEM FOR MOTOR VEHICLES
Filed May 18, 1929
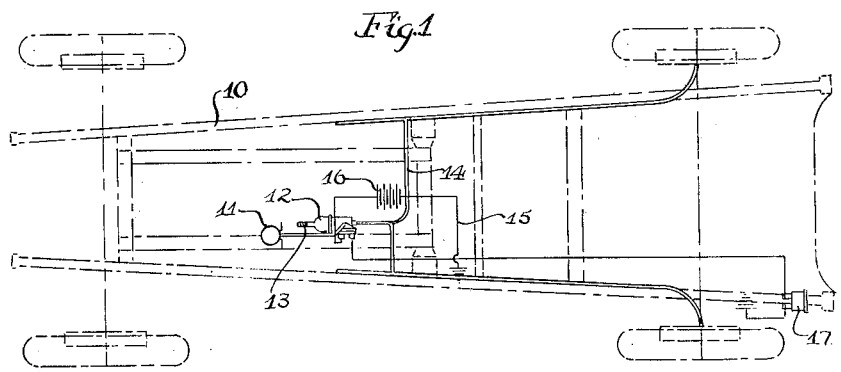
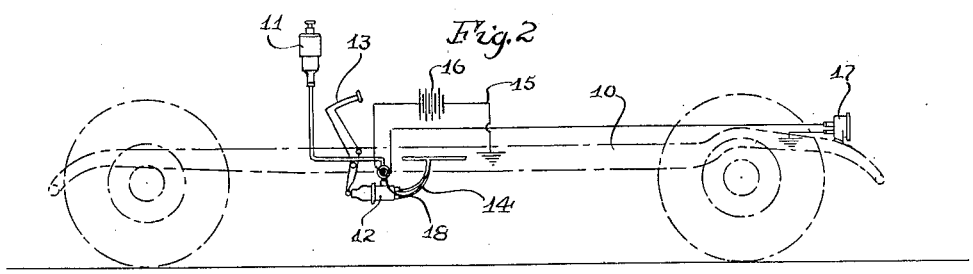
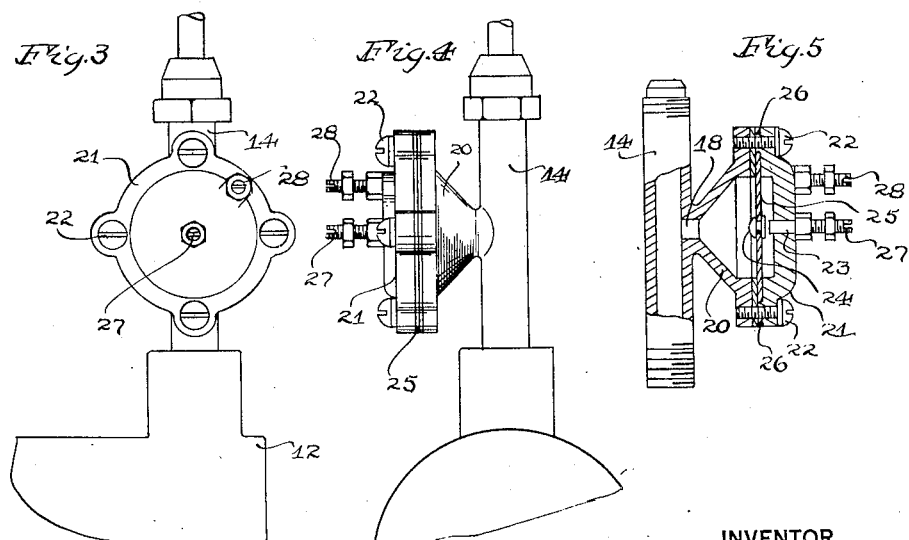
INVENTOR
Kenneth D. Preston and
Hamilton W. Preston
BY
Their ATTORNEY Patented Feb. 13, 1934

1,946,759

UNITED STATES PATENT OFFICE 1,946,759

SIGNAL SYSTEM FOR MOTOR VEHICLES

Kenneth D. Preston, Hornell, N. Y., and Hamilton Ward Preston, Jacksonville, Fla., assignors, by direct and mesne assignments, of two-thirds to said Kenneth D. Preston and one-third to said Hamilton Ward Preston Application May 18, 1929. Serial No. 364,266

8 Claims. (Cl. 177—352)

Our invention relates to signal systems for motor vehicles and more particularly to motor vehicles equipped with hydraulic brakes. The present application is filed to take the place of an abandoned application Serial No. 94,105, filed by us March 12, 1926, and disclosing the same subject matter as the present application.

An object of the invention is to provide a stop-light or other signal system in which the operation of the signal light is automatically controlled by an electrical switch so organized and related to the hydraulic brake system of the motor vehicle as to render it (the switch) wholly dependent for its successful operation upon the hydraulic pressure generated in the brake line through the ordinary application of the hydraulic brakes.

A further object of the invention is to provide a stop-light signal system in which the normally spaced contacts of the electrical switch thereof, are adapted to be brought together by the movement of a wholly encased and well protected diaphragm.

Other objects and advantages of the invention will be hereinafter pointed out.

In the drawing, wherein like reference characters denote like or corresponding parts.

Fig. 1 is a plan view of the system as installed on an automobile chassis equipped with hydraulic brakes;

Fig. 2 is a side elevation of the structure illustrated in Fig. 1;

Fig. 3 is a face view of the switch comprised in the electrical circuit;

Fig. 4 is a view taken at right angles to that of Fig. 3; and

Fig. 5 is a detail sectional view of said switch.

In the embodiment of the invention selected for illustration a conventional type automobile chassis 10 is shown. Said chassis 10 is equipped with hydraulic brakes which, it must be recognized, function because of forces transmitted through a relatively incompressible liquid contained and maintained within and confined by the hydraulic brake system thereof or therefor and the braking system, among other things, includes a supply tank 11, a master cylinder 12, a brake pedal 13, and a suitable feed-line 14 having branches extending to all points on the chassis where it is desired that the braking action shall be applied. The pedal 13, intermediately of its ends, is pivoted to the chassis frame. By exerting pressure on said pedal, the brakes, either two wheel or four wheel, as the case may be, are gradually and properly applied.

The signal system, as intimated, is dependent upon the hydraulic brake system for its successful operation. It comprises, in addition to said brake system, a simple electrical circuit 15. Within this circuit 15 there is provided a source of current supply 16, a signal 17 and an electrical switch 18, the latter, as indicated in Fig. 2, being operatively associated with the hydraulic brake system of the machine. By way of example, said signal 17 is shown as a stop-light signal mounted at the rear end of the chassis frame.

The feed-line 14, intermediately of the supply tank and the master cylinder 12, opens laterally as at 18 to a suitable chamber 20. This chamber 20 (see Fig. 5) flares outwardly and at its large diameter end is completely closed by a cover 21 of bakelite or other suitable insulating material. Said cover 21 is held in place by screws 22 and is centrally provided with an adjustable contact 23 which extends at one end slightly into said chamber for cooperation with a movable contact 24 mounted wholly therewithin. Said movable contact 24 is carried by a diaphragm 25 which extends across the large diameter end of said chamber and which, under the influence of the pressure in sa'd chamber, is adapted to make and break the electrical circuit 15 by bringing said contacts together. Preferably said diaphragm 25 is held in place by the cover screws 23 and is insulated from them by bosses 26 formed on the bakelite cover. Binding posts 27 and 28, engaging respectively the contact 23 and the diaphragm 25, are provided for the attachment of the circuit wiring. For convenience both in assembly and manufacture, that section of the feed-line open to the chamber 20 is made removable.

The operation of the system is as follows: As pressure is exerted on the brake pedal 13 to retard the progress of the vehicle, the hydraulic pressure in the feed-line 14 builds up and, since said feed-line is open to the chamber 20 within which the diaphragm 25 is enclosed, obviously such line pressure acts directly upon said diaphragm. This pressure, acting upon said diaphragm, causes it (the diaphragm) to bulge outwardly or toward the bakelite cover, and through such deformation brings the contacts together. In this way, the electrical circuit 15 within which the signal light is interposed, is closed. To regulate the pressure required to close the electrical circuit the adjustable contact 23 may be set either closer to or further away from the movable contact 24 than is shown.

It will be noted that incident to the applying of the brakes, viz. incident to the building up or increase of the hydraulic pressure in the feed line, the diaphragm functions for effecting a closing of the switch and a consequent giving of the signal and that incident to a release of the pressure for the release of the brake the diaphragm functions to effect an opening of the switch and a consequent discontinuance of the signal.

While we have described our invention in detail in its present preferred embodiment, it will be obvious to those skilled in the art after understanding our invention, that various changes and modifications may be made therein without departing from the spirit or scope thereof. We aim in the appended claims to cover all such modifications and changes.

What we claim as our invention and desire to secure by Letters Patent is:

1. In combination, a hydraulic brake system that includes a master control container, means for forcibly contracting at will the control container, liquid operated brakes, piping leading from the interior of said master control container to said brakes, and an incompressible liquid within and filling the master control container and the pipes leading therefrom to the brakes; an electric system that includes a source of current supply, a signal and an electric switch having a movable contact member controlled as to switch opening and closing movements by a positionable member of a switch control container; and said switch control container that provides said positionable member for controlling the switch opening and closing movements of the movable contact according to pressure conditions of the incompressible liquid within the switch control container; said switch control container being in direct communication with the liquid containing space of the hydraulic brake system whereby upon force being applied in a manner to effect a contracting of the master control container there simultaneously results an increase in the pressure of the liquid and which increase of pressure is exerted against the movable member of the switch control container as well as against the brake parts that are under the direct influence of the incompressible liquid in the hydraulic brake system.

2. In combination, a hydraulic brake system that includes an expansible and contractible master control container, a foot pedal for forcibly contracting the same, liquid operated brakes, piping leading from the interior of said master control container to said brakes and an incompressible liquid within and filling the master control container and the pipes leading from the master container to the brakes; an electric system that includes a source of current supply, a signal and an electric switch having a movable contact member for determining the opening and closing of said electric switch; and an expansible and contractible switch control container which provides a movable member for positioning the movable contact according to pressure conditions within the switch control container; said switch control container being in direct communication with the liquid containing space of the hydraulic brake system.

3. In combination, a hydraulic brake system that includes an expansible and contractible master control container, means for forcibly contracting the same, liquid operated brakes, piping leading from the interior of said master control container to said brakes, and an incompressible liquid within and filling the master control container and the pipes leading therefrom to the brakes; an electric system that includes a source of current supply, a signal and an electric switch having a movable contact member; and an expansible and contractible switch control container which provides a movable member for positioning the movable contact to switch opening and closing position according to pressure conditions within the switch control container; said switch control container being in direct communication with the liquid containing space or sections of the hydraulic brake system and operable therefrom whereby upon force being exerted in a manner to effect a contracting of the master control container there is effected a simultaneous increase in pressure that is exerted against the movable member of the switch control container with a consequent positioning of the movable contact of the electric switch, and also an effective operation of the hydraulic brakes.

4. In a motor vehicle of the automobile type, the combination of a hydraulic brake system that is dependent for its functioning upon a relatively incompressible liquid contained and maintained within the system, and a signal means that includes a diaphragm having a liquid contact with the hydraulic brake system and operable under the influence of the liquid pressure in said hydraulic brake system to cause a giving of a signal when the liquid pressure is increased incident to the application of the brakes and to cause a discontinuance of the signal when the liquid pressure is decreased incident to the release of the brakes.

5. In a motor vehicle of the automobile type, the combination of a hydraulic brake system that is dependent for its functioning upon forces transmitted through a relatively incompressible liquid maintained within the system, an electrical circuit including a signal and a source of current supply, an electrical switch including a diaphragm having a liquid contact with the hydraulic brake system, said switch having one of its contact members movable under the influence of pressure of the liquid in said hydraulic brake system on said diaphragm to make and break said circuit whereby incident to an application of the brakes the signal is given and whereby incident to a release of the brakes there is a discontinuance of the signal.

6. In a motor vehicle of the automobile type, the combination of a hydraulic brake system within which the relatively incompressible liquid upon which the system is dependent for its functioning is maintained, and a signal system that includes and is dependent for its functioning upon a diaphragm having a liquid contact with the hydraulic brake system and which diaphragm is under the influence of pressure of the liquid in said hydraulic brake system for effecting a giving of the signal when the pressure on the liquid is increased incident to the application of the brakes and for effecting a discontinuance of the signal incident to a release of the brakes.

7. In a motor vehicle of the automobile type, in combination, a hydraulic brake system which is dependent for its functioning upon relatively incompressible liquid continuously confined therein, and a signal means having a diaphragm for controlling the giving and discontinuance of the signal, which said diaphragm has liquid contact with the hydraulic brake system and is movable under the influence of the pressure of the liquid in said hydraulic brake system so as to cause a giving of the signal incident to brake application and so as to cause a discontinuance of the signal incident to brake release.

8. In an automobile, the combination of a hydraulic brake system dependent for its functioning upon a suitable liquid maintained therein, said system including brakes and a brake pedal operable to apply said brakes by hydraulic pressure, a signal, and means for controlling the operating of said signal which said means comprises a diaphragm having a liquid contact with the hydraulic brake system and positionable for causing the signal to be given upon the applying of the brake and for causing a discontinuance of the signal upon the release of the brakes.

KENNETH D. PRESTON,
HAMILTON WARD PRESTON.